United States Patent [19]

Vigo et al.

[11] Patent Number: 4,851,291

[45] Date of Patent: Jul. 25, 1989

[54] TEMPERATURE ADAPTABLE TEXTILE FIBERS AND METHOD OF PREPARING SAME

[75] Inventors: Tyrone L. Vigo, New Orleans, La.; Cynthia M. Frost, Marietta, Ga.; Joseph S. Bruno, Chalmette; Gary F. Danna, New Orleans, both of La.

[73] Assignee: The United States of America as represented by the Secretary of Agriculture, Washington, D.C.

[21] Appl. No.: 55,476

[22] Filed: May 29, 1987

Related U.S. Application Data

[63] Continuation-in-part of Ser. No. 876,015, Jun. 19, 1986, abandoned, which is a continuation-in-part of Ser. No. 626,850, Jul. 2, 1984, which is a continuation-in-part of Ser. No. 409,266, Aug. 18, 1982, abandoned.

[51] Int. Cl.$^4$ .............................................. D02G 3/00
[52] U.S. Cl. .................................... 428/393; 428/361; 428/375; 428/376; 428/389; 428/392; 428/394; 428/395; 428/396; 428/398; 428/913
[58] Field of Search .............. 428/407, 396, 375, 378, 428/392, 393, 394, 395, 913, 402, 364, 376, 398, 361, 389; 8/115.51, 115.6

[56] References Cited

U.S. PATENT DOCUMENTS

| | | | |
|---|---|---|---|
| 3,607,591 | 9/1971 | Hansen | 264/209 |
| 4,259,401 | 3/1981 | Chahroudi et al. | 428/913 |
| 4,268,558 | 5/1981 | Boardmann | 428/913 |
| 4,273,667 | 6/1981 | Kent et al. | 252/70 |
| 4,470,917 | 9/1984 | Hawe et al. | 428/402 |
| 4,504,402 | 3/1985 | Chen et al. | 428/407 |
| 4,512,388 | 4/1985 | Claar et al. | 428/402 |
| 4,572,864 | 2/1986 | Benson et al. | 428/913 |
| 4,587,279 | 5/1986 | Salyer | 428/913 |

FOREIGN PATENT DOCUMENTS 1584559 2/1981 United Kingdom .

OTHER PUBLICATIONS

Chemical Abstract 98:181097d.
Chemical Abstract 98:38951t.
Chemical Abstract 99:140843w.
Vigo, T. L. et al., "Temperature-Adaptable Hollow Fibers Containing Polyethylene Glycols", J. Coated Fabrics, vol. 12, pp. 243-254, 1983.
Vigo, T. L. et al., "Temperature-Sensitive Hollow Fibers Containing Phase Change Salts", Textile Research Journal, vol. 52, pp. 633-637, 1982.
Chemical Abstract 98:91147r.
Chemical Abstract 98:91148s.
Chemical Abstract 100:109161n.
Chemical Abstract 100:176318g.
Chemical Abstract 98:18087s.
Chemical Abstract 96:165699e.
Chemical Abstract 98:199784k.
Chemical Abstract 98:40621h.

*Primary Examiner*—Lorraine T. Kendell
*Attorney, Agent, or Firm*—M. Howard Silverstein

[57] ABSTRACT

Temperature adaptable textile fibers are provided in which phase-change or plastic crystalline materials are filled within hollow fibers or impregnated upon non-hollow fibers. The fibers are produced by applying solutions or melts of the phase-change or plastic crystalline materials to the fibers. Cross-linked polyethylene glycol is especially effective as the phase change material, and, in addition to providing temperature adaptability, it imparts improved properties as to soil release, durable press, resistance to static charge, abrasion resistance, pilling resistance and water absorbency.

27 Claims, No Drawings

TEMPERATURE ADAPTABLE TEXTILE FIBERS AND METHOD OF PREPARING SAME

CROSS REFERENCE TO RELATED APPLICATIONS

This is a continuation-in-part of Ser. No. 876,015, filed June 19, 1986, now abandoned which in turn is a continuation-in-part of Ser. No. 626,850, filed July 2, 1984 which in turn is a continuation-in-part of Ser. No. 409,266, filed Aug. 18, 1982, now abandoned.

BACKGROUND OF THE INVENTION

1. Field of the Invention

This invention relates to modified textile fibers.

2. Description of the Prior Art

The concept of preparing a temperature-adaptable hollow fiber has been previously demonstrated and described in U.S. Pat. No. 3,607,591. This invention incorporates a gas into liquid inside the fiber that increases the diameter of the fiber and thus increases its thermal insulation value when the liquid solidifies and the solubility of the gas decreases. However, this invention exhibits serious limitations. It is limited to use with only hollow textile fibers and is only applicable in cold weather situations, i.e., when the environmental temperature drops below the freezing point of the liquid in the fiber. Furthermore, this modified hollow fiber system was not evaluated for its ability to reproduce its thermal effect after various heating and cooling cycles.

The aerospace industry has reported some phase-change materials (inorganic salt hydrates such as calcium chloride hexahydrate, lithium nitrate trihydrate, zinc nitrate hexahydrate and polyethylene glycol with an average molecular weight of 600) 600 ) of uses in spacecraft (Hale, et al., "Phase Change Materials Handbook", NASA Contractor Report CR-61363, Sept. 1971). These materials have also been used in solar collectors and heat pumps in residences (Carlsson, et al., Document D12:1978, Swedish Council for Building Research). However, in these and similar publications, the suitability of phase-change materials for effective and prolonged heat storage and release is influenced by the substrate in which they are stored, its geometry and thickness, the effect of impurities and the tendency of the phase-change materials to supercool and exhibit reversible melting and crystallization. Moreover, and perhaps the most significant deficiency and limitation of the above recommendations, is the fact that the phase-change materials were recommended as incorporated into metal containers, plastic pipes and other nonporous substrates or very thick insulation such as wall board. No process or suitable conditions for the incorporation of these types of materials into hollow or non-hollow textile fibers has been described. Therefore, the problem of choosing a textile fiber and combining it with a phase-change material in order to produce thermal storage and release properties that could be retained for a minimum of 5 heating and cooling cycles is an extremely difficult one.

In addition to substances that store or release thermal energy due to melting and/or crystallization (phase-change materials) there is another class of substances that are characterized by their high enthalpies or thermal storage and release properties. These substances are commonly called plastic crystals, and have extremely high thermal storage or release values that occur prior to and without melting, i.e., they have thermal energy available without undergoing a change of state such as solid to liquid (melting) or liquid to solid (crystallization). Although the precise reasons why plastic crystals exhibit such unique thermal behavior prior to a change of state have not been verified, this thermal effect is believed to be due to a conformational and/or rotational disorder in these substances. Plastic crystal materials such as pentaerythritol and other polyhydric alcohols have been recommended for use in passive architectural solar designs and active solar dehumidifier or solar cooling systems (D. K. Benson, et al., Proc. Eleventh No. Am. Thermal Analysis Conf. 1981) because of their high thermal storage and release values that occur much below their melting point. However, as with the phase-change materials, no process or suitable conditions for the incorporation of these plastic crystals into hollow or non-hollow textile fibers has been described.

SUMMARY OF THE INVENTION

Temperature-adaptable textile fibers are provided which store heat when the temperature rises and release heat when the temperature decreases, in which phase-change or plastic crystalline materials are filled within hollow fibers, or impregnated upon non-hollow fibers.

The fibers are produced by dissolving the phase-change or plastic crystalline materials in a solvent such as water, thereafter filling the hollow fibers, or impregnating the non-hollow fibers, with the solution, followed by removal of the solvent. Alternatively, in the case of phase-change materials, the material may be applied to the fibers from a melt rather than solution.

The resultant product is a modified fiber which is temperature adaptable in both hot and cold environments for as many as 150 heating and cooling cycles, by releasing heat when the temperature drops, and storing heat when the temperature rises. As such, fabrics made from such fibers may be used to protect plants and animals, may be incorporated in protective clothing, and generally speaking may be employed in environments where temperature fluctuations need to be minimized.

When polyethylene glycol is used as the impregnating material, it is insolubilized on the fiber by cross-linking, and the resultant product imparts valuable properties to the fabric, in addition to thermal properties, including the properties of soil release, durable press, resistance to static charge, abrasion resistance, pilling resistance and water absorbency. Furthemore, polyethylene glycol may be impregnated on cellulosic fibers other than textile fabrics, such as paper and wood pulp fibers, for the purpose of imparting the above properties thereto.

DESCRIPTION OF THE PREFERRED EMBODIMENTS

In the practice of the present invention the phase-change or plastic crystalline materials which are to be filled into such hollow fibers as rayon or polypropylene, or impregnated into non-hollow fibers such as cotton or rayon, first are dissolved in a solvent to form a solution. Water is a suitable solvent in most instances, although some materials are more readily dissolved in alcohol such as ethyl alcohol or chlorinated hydrocarbons such as carbon tetrachloride.

Wide ranges of solution concentrations are suitable. The solution should not be too viscous that it interferes with the ability of the solution to fill the hollow fibers or to evenly impregnate the non-hollow fibers, and it should not be too dilute that only minimal amounts of material are deposited within or on the fibers.

Previously known techniques for filling hollow fibers are suitable, such as taught in "Hollow Fibers—Manufacture and Application", editor Jeanette Scott, published by Noyes Data Corp., 1981, and includes metering the desired aqueous solution into the hollow fibers as they are formed by extrusion during wet spinning.

As to impregnating non-hollow fibers, previously known immersion and coating techniques for textile fibers are suitable, such as techniques for finishing or dyeing, or imparting fire-retardancy or wash-and-wear.

As a laboratory procedure for filling small numbers of fibers, the following method may be employed: A plurality of fibers are formed into a bundle. One end of the bundle is immersed in solution, while the other end is snugly inserted into an open of a plastic or rubber tube or hose which is connected to an aspirator, thereby drawing solution into the fibers.

After the solution has filled the hollow fibers, or has coated the non-hollow fibers, solvent is removed from the solution to deposit the material within or upon the fibers. Prior art solvent removal techniques in the textile art are suitable, such as air drying or oven drying. These techniques are well known in connection with fabric finishing or dyeing, or imparting flame-retardancy or wash-and-wear to textiles. In some instances, the solvent can be removed by reduced pressure or solvent extraction.

In the case of non-hollow fibers, a preliminary solvent removal step may be included such as the use of squeeze rollers to remove excess solvent prior to drying. Such a preliminary step is well known in the textile treatment art.

During the primary drying step, the temperature preferably is maintained below the melting point of the phase-change material or below the solid-to-solid transition temperature of the plastic crystalline material.

After removal of solvent, in the case of hollow fibers, the fiber ends may be sealed as taught in the previously mentioned book on hollow fibers, and thereafter the fibers may be formed into woven or nonwoven fabric. With regard to impregnating non-hollow fibers, the step of treating the fibers with solution of the phase-change or plastic crystalline material preferably is carried out after the fibers have already been formed into fabric.

As an alternative to dissolving the phase-change material in a solvent prior to application to the fibers, such materials may first be melted. Thereafter, the melt itself is filled into or impregnated upon the fibers and subsequently cooled for the purpose of resolidification.

Any phase-change or plastic crystalline material which is chemically and physically compatible with the fibers is suitable, which can be determined through routine experimentation. The expression "chemically and physically compatible", as used in the specification and claims, means that the material does not react with the fibers so as to lose its phase-change or transition properties, is capable of being filled within the hollow fiber, or impregnated upon the non-hollow fiber, and, specifically with regard to phase-change materials, the material must be able, in its liquid phase, to be retained within the hollow fiber, or remain impregnated upon the non-hollow fiber. The expression "phase-change material", as used herein, refers to materials which transform from solid to liquid and back, at a particular temperature; and "plastic crystalline material" refers to material which changes from one solid composition to another, and back, at a particular temperature. It will be obvious that only those materials whose temperature of phase change or transition falls within a temperature of practical use for the resultant fabric ordinarily should be employed in the practice of the present invention, although, under special circumstances, it may be useful to employ a material whose phase change or transition temperature falls outside this normal range.

Preferably the phase-change materials are selected from the group consisting of congruent inorganic salt hydrates and polyethylene glycols, while the plastic crystalline materials are polyhydric alcohols. More particularly, the phase-change material are selected from the group consisting of calcium chloride hexahydrate in admixture with strontium chloride hexahydrate, lithium nitrate trihydrate and zinc nitrate hexahydrate, polyethylene glycols having 5 to 56 monomer units with an average molecular weight ranging from 300 to 3350.

The polyhydric alcohols preferably are selected from the group consisting of pentaerythritol, 2,2-dimethyl-1,3-propanediol, 2-hydroxymethyl-2-methyl-1,3-propanediol, or amino alcohols such as 2-amino-2-methyl-1,3-propanediol.

With regard to specific phase-change and plastic crystalline materials, preferred concentrations (weight percent of solution) in aqueous solutions for application to fibers are as follows (in some cases the amount of material which is deposited in or on specific types of fibers, after solvent removal, also is given):

(a) 10–40% sodium sulfate decahydrate in combination with 3–10% sodium borate decahydrate added to prevent supercooling.

(b) 45–80% calcium chloride hexahydrate in combination with 1–2.5% strontium chloride hexahydrate added to prevent supercooling, 0.5–10.0 grams of material deposited per gram of rayon or cotton fiber, and 0.4–1.6 grams per gram of polypropylene fiber.

(c) 80–95% zinc nitrate hexahydrate, 0.5–17.0 grams deposited per gram of rayon or cotton, and 1.0 to 1.6 grams per gram of polypropylene.

(d) 80–100% lithium nitrate trihydrate, 3–10 grams deposited per gram of rayon or cotton, and 0.2–1.4 grams per gram of polypropylene.

(e) 15–65% polyethylene glycol (300–3350 m.w.), 0.25–12.0 grams deposited per gram of rayon, cotton, wool, polyester, polypropylene and so forth.

(f) 20–40% pentaerythritol, 1.0–2.0 grams deposited per gram of rayon or cotton, and 0.4–0.8 grams per gram of polypropylene (g) 40–60% 2-amino-2-methyl-1,3-propanediol, 0.4–2.8 grams deposited per gram of rayon or cotton, and 0.8–1.2 grams per gram of polypropylene.

(h) 40–60% 2,2-dimethyl-1,3-propanediol, 0.4–2.8 grams deposited per gram of rayon or cotton, and 0.7–1.1 grams per gram of polypropylene.

(i) 40–60% 2-hydroxymethyl-2-methyl-1,3-propanediol, 0.5–5.0 grams per gram of rayon or cotton, and 0.6–1.0 grams per gram of polypropylene.

In the case of using polyethylene glycol as the phase change material, especially on non-hollow fibers, the material preferably is cross-linked on the fiber to make it water insoluble, and thereby resistant to laundering. While there are several cross-linking agents known in the prior art for polyethylene glycol, those having three or more reactive sites, e.g., 1,3-bis (hydroxymethyl)-4,5- dihydroxyimidazolidinone-2, more commonly known as dihydroxydimethylol ethylene urea (DMDHEU), have been able to achieve the appropriate degree of cross-linking at the necessary amount of add-on. For instance, far more polyethylene glycol is placed on the fiber in the practice of the present invention than was previously done in the prior art of using polyethylene glycol to impart durable press to fabrics; and, to date, only the type of cross-linking agent as described above has been able to achieve appropriate cross-linking at such a degree of add-on. Thus, only trifunctional or greater functionality cross-linking agents are suitable. In addition, such cross-linking is carried out by removal of solvent and occurs by an ionic mechanism rather than by free radical reactions promoted or caused by exposure of the polyol to high energy radiation.

In the case of impregnating a non-hollow fiber, such as cellulose, polyester, wool or other fiber, with cross-linked polyethylene glycol, the preferred weight percent of the solution is about 30–60% polyethylene glycol (300–20,000 mw), and the add-on generally is from 0.15 to 1 grams per gram of fiber, preferably about 0.25–0.50 grams/gram. Below 0.25 grams/gram, add-on usually is not sufficient to impart thermal storage and release properties to the modified fibers, although other above-enumerated properties still can be achieved. Whatever the add-on, the degree of cross-linking is important. Undercross-linking will not make the polymer water insoluble. Overcross-linking destroys or negates thermal activity, and also can adversely affect other properties such as tensile and abrasion properties, particularly of cellulosic fibers and/or cellulosic-synthetic blends.

As to non-hollow cellulosic substrates, the polyethylene glycol may be cross-linked in the above amount to non-textile materials such as paper and wood pulp fibers for the purpose of enhancing the properties thereof.

When cross-linking the polyethylene glycol, it is important to impart a sufficient degree of cross-linking so that the material is water insoluble. It is also important to avoid too much cross-linking, which will inhibit the material's ability to change phases. It has been determined that the solution of the polyethylene glycol preferably should contain, by weight, about 8–16% DMDHEU as the cross-linking agent, and 0.5–5.0% acid catalyst, preferably mild catalysts such as magnesium chloride/citric acid catalyst, sodium bisulfate, p-toluenesulfonic acid or combinations of p-toluenesulfonic acid with other acid catalysts, in order to make the polyethylene glycol water insoluble, and yet able to retain its ability to change phases upon heating and cooling. With high molecular weight polyethylene glycols, e.g., greater than 1500, specific acid catalysts such as p-toluenesulfonic acid by itself or in admixture with other acid catalysts such as $MgCl_2$ and citric acid, are necessary to insolubilize the polyol onto the fiber and impart the desired properties.

Typical small scale operating conditions for pad dry-cure and for applying cross-linked polyethylene glycol to fibers include: a wet pick up of about 80–200%, drying at about 50°–80° C. for about 3–9 minutes, and curing at about 100°–170° C. for about 0.5–5 minutes. The ability to cure at lower temperatures, e.g., about 100°–130° C., and yet still be able to fix the polymer so that it doesn't wash off is advantageous.

It should be understood that the polyethylene glycol is impregnated on the fibers and is not part of a copolymer fiber structure. Nor is it present as an additive for other materials impregnated on such fiber. Still further, preferably it is unsubstituted, i.e., it only has hydroxyl end groups.

Laundering studies show that the polyethylene glycol-impregnated non-hollow fibers are durable for 50 launderings, that the beneficial thermal properties are retained, and that pilling resistance is much better than that of an untreated surface laundered the same number of times.

The capabilities of phase-change materials in the practice of the present invention varies from one material to another. For example, many congruent inorganic salt hydrates exhibit a loss in thermal effectiveness and a tendency to supercool after 50 heating and cooling cycles, whereas polyethylene glycol does not do so up to 150 cycles. As another example, sodium sulfate decahydrate in combination with sodium borate decahydrate loses its effectiveness after 5 heating and cooling cycles. Likewise, there is a variation among the plastic crystalline materials. For example, pentaerythritol is only moderately effective because it has a tendency to sublime from the fibers on prolonged thermal cycling.

As a general rule, the plastic crystalline materials are more advantageous than the phase-change materials since the thermal storage and release effects of the former are not dependent on melting and crystallization, and often occur at temperatures much below such melting or crystallization temperatures. Modified fibers containing suitable plastic crystal materials have little tendency to supercool or lose thermal effectiveness on prolonged thermal cycling.

The hollow fibers preferably are rayon and polypropylene of the single cavity type, but any hollow fiber type such as polyester or polyamide, and hollow fiber geometry such as multiple cavity are suitable. The non-hollow fibers preferably are cotton, mercerized cotton, rayon fibers, yarns and/or fabrics, but other non-hollow fibers are suitable such as wool and polyamides. With specific regard to polyethylene glycol as the impregnating material for non-hollow fibers, the substrate may be wood pulp, paper, a diverse group of natural and/or synthetic fiber types, e.g., cellulosics, proteinaceous, polyester, polypropylene, polyamide, glass, acrylic, blends of the preceding, and so forth.

Fibers with high moisture regain, i.e., 4% or greater, such as rayon or cotton are preferred to fibers such as polypropylene for incorporation of congruent inorganic salt hydrates because rayon and cotton prolongs the number of thermal cycles for which the modified fibers are thermally effective. That is, these phase-change materials lose some waters of hydration or lose waters of hydration at a rate much faster than rehydration after prolonged thermal cycling. Rayon and cotton are superior to polypropylene in such situations because (a) rayon and cotton have a greater affinity and capacity for congruent inorganic salt hydrates and provide initially higher thermal storage and release values; and (b) they retain these desirable thermal characteristics for a longer number of cycles because of their ability to provide water from the fiber and thus minimize or retard dehydration of the hydrates.

Hydrophilic fibers are superior to hydrophobic fibers in many instances because the former have much greater affinity for polyethylene glycol than the latter. Presumably this is due to their hydrophilic nature and ability to form hydrogen bonds with these phase-change materials; and thus, fibers such as rayon or cotton retain greater amounts of the polyethylene glycol.

The minimum length of the hollow fibers that are to be filled generally should be about 10 mm, because smaller fibers are difficult to handle. The preferred length is at least 30 mm. There is no maximum length, and thus continuous filaments can be filled with the materials herein. Any non-hollow fiber length and geometry may be modified by the present invention. The process is suitable for treatment of woven and non-woven yarns and fabrics or any other textile structure derived from non-hollow fibers.

The thermal transfer properties of the product of the present invention are illustrated in the following examples.

EXAMPLE 1

Incorporation of Polyethylene Glycol (av. molecular wt. of 600) into Hollow Rayon Fibers Hollow Rayon Fibers Hollow rayon fibers (38 mm in length) were tied into a parallel fiber bundle, tightly aligned inside an O-ring in a vertical position, and a 57% aq. solution of polyethylene glycol with an average molecular weight of 600 (Carbowax 600) aspirated through the fibers under reduced pressure for 30 minutes or until the solution was visually observed to be at the top of the fiber. The modified fibers were then cooled at $-15°$ C. for 1 hour and dried at 18° C. for 24 hours to remove excess water and cause the phase-change material to solidify. Excess solid on the exterior of the fiber was removed, then the fiber was conditioned at 25° C./45% RH in a dessicator containing $KNO_2$ to produce a modified fiber containing on a weight/weight basis, 7.0 grams of Carbowax 600 per gram of rayon fiber. The modified fibers were then evaluated for up to 150 heating and cooling cycles at $-40°$ to $+60°$ C. for their ability to store and release thermal energy by differential scanning calorimetry. At 1 heating and cooling cycle, the thermal energy available for storage on increasing temperature was 39.1 calories/gram in the temperature interval of $-3$ to $+37°$ C. and the thermal energy available for release on decreasing temperature 42.6 calories/gram in the temperature interval of $-23°$ to 17° C.

After 150 thermal cycles, the thermal energy available for storage was 41.9 calories/gram and for release 41.0 calories/gram for the same temperature intervals.

In contrast, unmodified hollow rayon fibers after 1 heating and cooling cycle exhibited fairly linear behavior and had in the same temperature ranges, thermal storage values of 16.2 calories/gram and release values of 14.9 calories/gram due only to the specific heat of the unmodified fiber.

EXAMPLE 2

Incorporation of Polyethylene Glycol (av. molecular wt. of 600) into Hollow Polypropylene Fibers Polypropylene Fibers Hollow polypropylene fibers (135 mm in length) were prepared and treated as in Example 1 with a 57% aqueous solution of polyethylene glycol (Carbowax 600), cooled, dried and conditioned, as in Example 1, to produce a modified fiber containing 1.2 grams of Carbowax 600 per gram of polypropylene fiber. When the modified hollow fibers were evaluated by thermal analysis for up to 50 heating and cooling cycles at $-40°$ to $+60°$ C., their thermal energy available for storage after 1 heating and cooling cycle was 32.3 calories/gram in the temperature interval of $-3°$ to $+37°$ C. (increasing temperature) and for release 31.5 calories/gram in the temperature interval of $-23°$ to $+17°$ C. (decreasing temperature). After 50 thermal cycles, thermal energy for storage in the modified fibers was 35.2 calories/gram and for release 26.9 calories/gram at the same temperature intervals for heating and cooling.

In contrast, unmodified hollow polypropylene fibers after 1 heating and cooling cycle exhibited fairly linear behavior and had in the same temperature intervals, thermal storage values of 16.9 calories/gram and release values of 15.4 calories/gram, due to only the specific heat of the unmodified fibers.

EXAMPLE 3

Incorporation of Polyethylene Glycol (av. molecular wt. of 3350) into Hollow Polypropylene Fibers Hollow polypropylene fibers were treated as in Example 2 with a 57.2% aqueous solution of polyethylene glycol (Carbowax 3350), cooled, dried, and conditioned, as in Example 1, to produce a modified fiber containing 1.0 gram of Carbowax 3350 per gram of polypropylene fiber. When the modified hollow fibers were evaluated by thermal analysis for up to 50 heating and cooling cycles at $-40°$ to $+80°$ C., their thermal energy available for storage after 1 heating and cooling cycle was 35.6 calories/gram in the temperature interval 42° to 77° C. (increasing temperature) and for release 33.5 calories/gram in the temperature interval of 17° to 52° C. (decreasing temperature). After 50 thermal cycles, thermal energy for storage in the modified fibers was 32.8 calories/gram and for release 34.3 calories/gram at the same temperature intervals for heating and cooling.

EXAMPLE 4

Incorporation of Polyethylene Glycol (av. molecular wt. of 3350) into Hollow Rayon Fibers Hollow rayon fibers were treated with the same concentration of Carbowax 3350 as in Example 3, cooled, dried, and conditioned, as in Example 1, to produce a modified fiber containing 11.3 grams of Carbowax 3350 per gram of rayon fiber. Evaluation of the modified hollow fibers by calorimetry for up to 50 heating and cooling cycles at $-40°$ to $+80°$ C., indicated that their thermal energy available for storage after 1 heating and cooling cycles was 43.5 calories/gram in the temperature interval of 42° to 77° C. and for release 49.6 calories/gram in the temperature interval of 17°–52° C. After 50 thermal cycles at the same temperature intervals, thermal energy for storage in the modified fibers was 43.3 calories/gram and for release 47.1 calories/gram.

EXAMPLE 5

Incorporation of Polyethylene Glycol (av. molecular wt. 1000) into Hollow Rayon Fibers A 57.4% aqueous solution of polyethylene glycol (Carbowax 1000) was aspirated through hollow rayon fibers under reduced pressure, cooled, dried, and conditioned, as in Example 1, to produce a modified hollow fiber containing 10.8 grams of Carbowax 1000 per gram of rayon fiber. When the modified fibers were evaluated by calorimetry for up to 50 thermal cycles at $-40°$ to $+60°$ C. their thermal energy available for storage after 1 heating cycle was 43.2 calories/gram in the temperature interval of 17° to 52° C. and for release after 1 cooling cycle 41.8 calories/gram in the temperature interval of −3° to 32° C. After 50 thermal cycles, thermal energy for storage in the modified fibers was 43.5 calories/gram and for release 41.6 calories/gram at the same temperature intervals for heating and cooling.

EXAMPLE 6

Incorporation of Polyethylene Glycol (av. molecular wt. 400) into Hollow Polypropylene Fibers A 57.1% solution of polyethylene glycol (Carbowax 400) was aspirated through hollow polypropylene fibers under reduced pressure, cooled, dried, and conditioned, as in Example 1, to produce a modified hollow fiber containing 1.2 grams of Carbowax 400 per gram polypropylene fiber. Evaluation of the modified fibers by calorimetry for up to 10 heating and cooling cycles at −40° to +60° C. indicated thermal storage values of 28.5 calories/gram (temperature interval: −28° to +12° C.) and release values of 24.9 calories/gram (temperature interval: −48° to −8° C.) after 1 heating and cooling cycle, respectively. After 10 thermal cycles, the thermal storage and release values at the same temperature intervals were respectively 28.1 calories/gram and 25.7 calories/gram.

EXAMPLE 7

Incorporation of Polyethylene Glycol (av. molecular wt. of 600) into Cotton Fabric 100% Desized, scoured, and bleached cotton printcloth (3.15 oz/yd$^2$; thread count 84 warp ×76 fill; 1 ft. wide ×9 ft. long) was immersed in a 50% aqueous solution of polyethylene glycol (Carbowax 600) at 25° C., then excess solution removed by running the treated fabric through a squeeze roller to a wet pickup of 100%. Two one ft.$^2$ samples were removed from the treated fabric, one of which was placed on a flat surface and allowed to air-dry overnight for 24 hours at 15° C., and the other dried for 85 seconds at 75° C. in a Mathis Laboratory Dryer (one that stimulates commercial drying without liquid migration). The drying procedure is to effect solidification of the phase-change material on the fabric. After drying, each treated fabric was conditioned, as described as in Example 1, to give a modified fabric containing 0.6 grams of Carbowax 600 per gram of cotton fabric. When the modified cotton fabrics were evaluated by thermal analysis at −23° to +37° C., their thermal energy available for storage was 18–20 calories per gram for 1 or 10 heating cycles, with little difference in these values for fabrics dried by each method. Similar results were obtained for thermal energy available for release (16–18 calories per gram for 1 or 10 cooling cycles). In contrast, the unmodified cotton fabric had thermal storage values of 11–12 calories per gram and release values of 10.5–11.8 calories per gram in the same temperature intervals, due only to the specific heat of the unmodified fibers.

EXAMPLE 8

Incorporation of LiNO$_3$.3H$_2$O into Hollow Rayon Fibers

Pure LiNO$_3$.3H$_2$O was melted at 30° C., then aspirated under reduced pressure into hollow rayon fibers that were subsequently cooled, dried, and conditioned, as in Example 1, to produce a modified hollow fiber containing 9.5 grams of lithium nitrate trihydrate per gram of rayon fiber. The modified fibers were then evaluated up to 50 thermal cycles at −40° to +60° C. Their thermal energy available for storage after 1, 10, and 50 heating cycles was respectively 72.4, 74.7 and 37.4 calories/gram, and for thermal release after 1, 10, and 50 cooling cycles, 53.1 42.2, and 9.8 calories/gram, with progressive supercooling occurring by 50 cycles. Temperature intervals for all heating cycles for measuring thermal storage were 17° to 42° C., while the temperature interval chosen for cooling cycles varied, and was −1° to 9° C., −7° to +2° C., and −22° to 17° C. for 1, 10 and 50 cooling cycles, respectively.

Although the rayon/lithium nitrate trihydrate system lost its thermal effectiveness on prolonged cycling, it was superior to either the pure LiNO$_3$.3H$_2$O alone or to this phase change material incorporated into the polypropylene hollow fiber. After 1 and 10 cycles thermal storage values for the pure LiNO$_3$.3H$_2$O were 65.8 and 23.0 calories/gram (1 and 10 cycles thermal storage values for the pure LiNO$_3$.3H$_2$O were 65.8 and 23.0 calories/gram (1 and 10 cycles) and 30.5 and 22.1 calories/gram (1 and 10 cycles) for the lithium nitrate trihydrate incorporated into the polypropylene fiber at a ratio of 1.9 grams/gram of fiber after cooling, drying and conditioning. On cooling, similar trends were observed. After 1 and 10 cooling cycles, the pure LiNO$_3$.3H$_2$O had thermal storage values of 50.0 and 2.3 calories/gram and the LiNO$_3$.3H$_2$O-treated fibers corresponding values of 4.7 and 0.2 calories/gram, the latter due only to the specific heat of the polypropylene fiber. Temperature values varied, particularly with cooling cycles, and generally were measured at intervals reflecting the peak temperature midpoint of crystallization on cooling.

EXAMPLE 9

Incorporation of Zn(NO$_3$)$_2$.6H$_2$O. into Hollow Rayon Fibers

A 89.7% aqueous solution of Zn(NO$_3$)$_2$.6H$_2$O was incorporated into hollow rayon fibers (38 mm in length) that were cooled, dried, and conditioned, as in Example 1, to produce a modified fiber with 15.0 grams of zinc nitrate hexahydrate per gram of rayon fiber. When the modified fiber was evaluated between −40° to +60° C. by differential scanning calorimetry, it produced 28.6 calories per gram for thermal storage (temperature interval: 22° to 46.6° C.), and 16.9 calories/gram for thermal release (temperature interval: −3° to 9° C.) after 1 cycle. After 5 thermal cycles, the corresponding thermal storage and release values were 36.6 calories/gram on heating (same temperature interval as 1 heating cycle) and 12.9 calories/gram on cooling (temperature interval: −3° to +9° C.).

When the same concentration of the above phase-change material was incorporated into hollow polypropylene fibers, the modified fibers contained 1.4 grams of zinc nitrate hexahydrate per gram of polypropylene. On their evaluation by calorimetry, their thermal storage values for the 1 and 5 heating cycles were respectively, 23.3 and 24.9 calories/gram (temperature interval: 22° to 48° C.) and for thermal release after 1 and 5 cycles, 8.2 and 5.7 calories/gram (temperature interval: 12° to 20° C.); with the latter value due only to the specific heat of the polypropylene fiber.

EXAMPLE 10

Incorporation of $CaCl_2.6H_2O/SrCl_2.6H_2O$ into Hollow Rayon Fibers

A 49.4% $CaCl_2.6H_2O$/1.0°% $SrCl_2.6H_2O$ aqueous solution was aspirated through hollow rayon fibers that were dried, cooled, and conditioned, as in Example 1, to produce a modified fiber containing 3.2 grams of calcium chloride hexahydrate/strontium chloride hexahydrate per gram of rayon fiber. When the modified fiber was evaluated by calorimetry at −40° to +60° C., it had thermal storage values of 11 calories/gram (temperature interval: 22° to 37° C.) and release values of 14 calories/gram (temperature interval: −8° to +17° C.) after 1 thermal cycle. After 10 heating and cooling cycles, its thermal storage value was 17 calories/gram and release value 16 calories/gram (same temperature interval as 1 cycle).

EXAMPLE 11

Incorporation of $Na_2SO_4.10H_2O/Na_2B_4O_7.10H_2O$ into Hollow Rayon Fibers A 40% $Na_2SO_4.10H_2O$/10% $Na_2B_4O_7.10H_2O$ aqueous solution was aspirated through hollow rayon fibers that were dried, cooled and conditioned, as in Example 1, to produce a modified fiber containing 0.1 gram of sodium sulfate hexahydrate/borax per gram of rayon fiber. When the modified fiber was evaluated by calorimetry at −40° to +60° C., it was practically indistinguishable from unmodified hollow rayon fibers in its thermal storage and release properties after 5 heating and cooling cycles, and exhibited no pronounced endotherms or exotherms (associated with storage and release effects) even after only 1 heating and cooling cycle. Consequently, all phase-change materials do not work.

EXAMPLE 12

Incorporation of 2,2-Dimethyl-1,3-propanediol into Hollow Rayon Fibers

Hollow rayon fibers cut from tow (135 mm in length) were prepared and treated, as in Example 1, with a 50% aqueous solution of 2,2-dimethyl-1,3-propanediol (DMP), cooled, dried and conditioned as in Example 1 to produce a modified fiber containing 2.8 grams of DMP per gram of rayon fiber. When the modified hollow fibers were evaluated by thermal analysis for up to 50 heating and cooling cycles at 7° to 62° C., their thermal energy available for storage after 1 heating and cooling cycle was 30.5 calories/gram in the temperature interval of 32° to 62° C. (increasing temperature) and for release 27.2 calories/gram in the temperature interval of 37° to 7° C. (decreasing temperature). After 50 thermal cycles, thermal energy for storage in the modified rayon fibers was 29.5 calories/gram and for release 26.4 calories/gram at the same temperature intervals for heating and cooling. In contrast, unmodified hollow rayon fibers after 1 heating and cooling cycle exhibited fairly linear behavior and had in the same temperature intervals, thermal storage values of 9.3 calories/gram and release values of 8.7 calories/gram, due to only the specified heat of the unmodified fibers.

EXAMPLE 13

Incorporation of 2,2-Dimethyl-1,3-propanediol into Cotton Fabric

100% desized, scoured, and bleached cotton printcloth (3.15 oz/yd$^2$; thread count 84 warp ×76 fill; 1 ft. wide ×9 ft. long) was immersed in a 50% aqueous solution of DMP, then excess solution removed from the fabric by running the treated fabric through a squeeze rolled to a wet pickup of 100%. Two 1 ft$^2$ samples were removed from the treated fabric, one of which was placed on a flat surface and allowed to air-dry overnight for 24 hours at 15° C., and the other dried for 85 seconds at 75° C. in a Mathis Laboratory Dryer (one that simulates commercial drying without liquid migration) The drying procedure is to effect solidification of the phase-change material on the fabric. After drying, each treated fabric was conditioned as described in Example 1 to give a modified fabric containing 0.6 grams of DMP per gram of cotton fabric. When these modified fabrics were evaluated by thermal analysis at 7° to 62° C., their thermal energy available for storage was 18–21 calories/gram for 1 or 10 heating cycles, with little difference in these values for fabrics dried by each method. Similar results were obtained for thermal energy available for release (16–18 calories/gram for 1 or 10 cooling cycles.) In contrast, the unmodified cotton fabric had thermal storage values of 8.6–9.1 calories/gram and release values of 7.9–8.1 calories/gram in the same temperature intervals, due only to the specific heat of the unmodified fibers.

EXAMPLE 14

Treatment of Non-hollow Rayon Fibers with 2,2-Dimethyl-1,3-propanediol

Staple rayon fibers (as two-plied yarn, 32–50 mm staple length; 30.7 mg/m denier) were immersed in excess 50% aqueous DMP solution, centrifuged for 5 minutes at 2080 rpm to remove excess DMP, cooled, dried and conditioned, as in Example 12, to produce a modified fiber containing 0.4 grams of DMP per gram of rayon fiber. When the treated rayon fibers were evaluated by thermal analysis for up to 50 heating and cooling cycles at 7° to 62° C., their thermal energy for storage after 1 heating and cooling cycle was 15.3 calories/gram in the temperature interval 32° to 62° C. (increasing temperature) and for release 12.4 calories/gram in the temperature interval of 37° to 7° C. (decreasing temperature). After 50 thermal cycles, thermal energy for storage of the treated rayon fibers was 12.5 calories/gram and for release 11.2 calories/gram at the same temperature intervals for heating and cooling.

EXAMPLE 15

Incorporation of 2-Hydroxymethyl-2-methyl-1,3-propanediol into Hollow Polypropylene Fibers Hollow polypropylene fibers were treated, as in Example 12, with a 50% aqueous solution of 2-hydroxymethyl-2-methyl-1,3-propanediol (HMP), cooled, dried and conditioned as above to produce a modified fiber containing 0.8 grams of HMP per gram of polypropylene fiber. When the modified hollow fibers were evaluated by thermal analysis for up to 50 heating and cooling cycles at 47° to 102° C., their thermal energy available for storage after 1 heating and cooling cycle was 32.7 calories/gram in the temperature interval of 72° to 102° C. (increasing temperature) and for release 28.8 calories/gram in the temperature interval of 77° to 47° C. (decreasing temperature). After 50 thermal cycles, thermal energy for storage in the modified fibers was 31.7 calories/gram and for release 28.4 calories/gram at the same temperature intervals for heating and cooling.

EXAMPLE 16

Treatment of Cotton Fibers with 2-Hydroxymethyl-2-methyl-1,3-propanediol

Cotton fibers (as mercerized sewing thread-three plied, 23–32 mm staple length and a denier of 31.8 mg/m) were immersed in excess 50% aqueous HMP solution, centrifuged for 5 minutes at 2080 rpm to remove excess HMP, cooled, dried and conditioned as in Example 12 to produce a modified fiber containing 0.7 grams of HMP per gram of cotton fiber. When the treated cotton fibers were evaluated by thermal analysis for up to 50 heating and cooling cycles at 47° to 102° C., their thermal energy for storage after 1 heating and cooling cycle was 27.5 calories/gram in the temperature interval 72° to 102° C. (increasing temperature) and for release 23.4 calories/gram in the temperature interval of 77° to 47° C. (decreasing temperature).

After 50 thermal cycles, thermal energy for storage of the treated cotton fibers was 25.3 calories/gram and for release 23.2 calories/gram at the same temperature intervals for heating and cooling. In contrast, untreated cotton fibers after 1 heating and cooling cycle exhibited fairly linear behavior and had in the same temperature intervals, thermal storage values of 10.0 calories/gram and release values of 8.9 calories/gram due to the specific heat of the unmodified fibers.

EXAMPLE 17

Treatment of Cotton Fibers with 2-Amino-2-methyl-1,3-propanediol

Cotton fibers (as mercerized sewing thread-three plied 25–32 mm staple length and a denier of 31.8 mg/m) were immersed in excess 50% aqueous 2-amino-2-methyl-1,3-propanediol (AMP), excess AMP removed and the fibers cooled, dried and conditioned as in Example 16 to produce modified cotton fibers containing 1.1 grams of AMP per gram of cotton fiber. When the treated cotton fibers were evaluated by thermal analysis for up to 50 heating and cooling cycles at −3° to 102° C., their thermal energy for storage after 1 heating and cooling cycle was 37.8 calories/gram in the temperature interval 72° to 102° C. (increasing temperature) and for release 20.0 calories/gram in the temperature interval of 92° to 52° C. (decreasing temperature). After 50 thermal cycles, thermal energy for storage of the treated cotton fibers was 30.2 calories/gram and for release 18.6 calories/gram at the same temperature intervals for heating and cooling.

EXAMPLE 18

Incorporation of Pentaerythritol into Hollow Rayon Fibers

Hollow rayon fibers cut from tow (135 mm in length) were prepared and treated, as in Example 12, with a 30% aqueous solution of pentaerythritol (PET), cooled, dried and conditioned, as in Example 12, to produce a modified fiber containing 1.2 grams of PET per gram of hollow rayon fiber. When the modified hollow fibers were evaluated by thermal analysis for up to 10 heating and cooling cycles at 152° to 207° C., their thermal energy available for storage after 1 heating and cooling cycle was 39.5 calories/gram in the temperature interval of 177° to 207° C. (increasing temperature) and for release 34.0 calories/gram in the temperature interval of 182° to 152° C. (decreasing temperature). After 50 thermal cycles, thermal energy for storage and release in the modified hollow rayon fibers was indistinguishable from the untreated hollow rayon fibers.

EXAMPLE 19

Incorporation of Polyethylene Glycol (av. molecular wt. 600) into Cotton Fabric by its Reaction with Crosslinking Agents 100% desized, scoured and bleached cotton printcloth (3.7 oz/yd$^2$; thread count 80 warp ×80 fill; 10 in. wide ×24 in. long) was immersed in an aqueous solution containing by weight 50% polyethylene glycol (Carbowax 600), 10% dihydroxydimethylolethylene urea (DMDHEU) 3% mixed catalyst (MgCl$_2$/citric acid) at 25° C., then excess solution removed by running the treated fabric through a squeeze roller at 50 lb. pressure to a wet pickup of 100%. The fabric was then mounted on a pin frame, dried 7 min. at 60° C. in a force-draft oven, then cured an additional 3 min. at 160° C. The treated fabric was subsequently given a conventional machine laundering and tumble drying (warm/cold cycle for 10 min. with commercial phosphate detergent and dried for 15 mins. on normal drying cycle) or alternatively washed for 20 mins. at 50° C. with running tap water and liquid detergent prior to tumble drying. The resultant fabric had a weight gain or add-on of 40.0% (0.4 gms. per gram of fiber). If the crosslinking agent were not employed, the polyethylene glycol would readily wash off on exposure to excess water. The modified fabric was conditioned at standard atmospheric conditions (65% RH/70° F.), and evaluated by thermal analysis at −3° to +37° C. It had thermal energy available for storage of 16.4 calories per gram for 1 or 10 heating cycles, with little difference in these values after the initial cycle. Similar results were obtained for thermal energy available for release at −17° to +23° C. (14.9 calories per gram for 1 or 10 cooling cycles). In contrast, the unmodified cotton had thermal storage values of 9.6 calories per gram and release values of 9.7 calories per gram in the same temperature intervals, due only to the specific heat of the unmodified fabric.

EXAMPLE 20

Attempts to Incorporate Polyethylene Glycol into Cotton Fabric Using Other Crosslinking agents Cotton printcloth (as in Example 19) was padded with 50% aqueous polyethylene glycol (Carbowax 1,000) containing 3% magnesium chloride/citric acid as the catalyst with the following crosslinking agents: with (a) 10% formaldehyde; (b) 10% diisopropyl carbamate; and (c) 10% dimethylolethylene urea (DMEU). In each instance the fabrics were treated (dried and cured) as in Example 1A, but little reaction took place between the polyethylene glycol and these crosslinking agents as evidenced by the very low add-ons (3–5% or 0.03–0.05 gm per gram of fiber). Thermal analyses of these fabrics showed them to essentially be no different than the untreated cotton fabrics with regard to their thermal storage and release fabric properties, with their heat content due only to the specific heat of the fiber.

EXAMPLE 21

Attempts to Incorporate Higher Molecular Weight Polyethylene Glycols into Cotton Fabrics Cotton printcloth (as in Example 19) was padded with various concentrations of aqueous polyethylene glycols (M.W. 3,350 and M. W. 8,000), DMDHEU and a magnesium chloride/citric acid catalyst (30% by wt. of the crosslinking agent). The following combinations were used: 30-50% aqueous polyethylene glycol (av. mol. wt. 8,000), 10% DMDHEU, 3% magnesium chloride/citric acid catalyst, 50% aqueous polyethylene glycol (av. mol. wt. 3,350), 10 to 15% DMDHEU, 3.0 to 4.5% magnesium chloride/citric acid catalyst. In each instance, the fabric were treated (dried and cured) as in Example 19, but only moderate weight gains were achieved (8-17% or 0.08-0.17 gm per gram of fiber) after laundering, indicating that not enough reaction had taken place to insolubilize the polymers. In all instances, the modified fabrics were essentially unchanged in their thermal storage and release characteristics, i.e., the same as the unmodified cotton fabrics from which they were derived.

EXAMPLE 22

Incorporation of Polyethylene Glycol (Average Molecular Weight 1,000) into Wool and into Polyester Fabrics by its Reaction with Crosslinking Agents Worsted wool fabric (5.4 oz/yd$^2$; thread count 55 warp ×45 fill; 10 in. wide ×10 in. long) was immersed in an aqueous solution containing by weight 50% polyethylene glycol (Carbowax 1000), 12% dihydroxydimethylolethylene urea (DMDHEU), 3.6% mixed catalyst (MgCl$_2$/citric acid) at 25° C., then excess solution removing by running the treated fabric through a squeeze roller at 50 lb. pressure to a wet pickup of 94%. The fabric was dried, cured and given 1 laundering as in Example 19, and had an add-on or weight gain of 48.0% (0.48 gm per gram of fiber) after drying and conditioning. As previously indicated, the polyethylene glycol will wash off readily in water if it is not crosslinked. The resultant fabric was evlaluated by thermal analysis at −3° to +37° C., and had thermal energy available for storage of 19.5 calories per gram for 1 or 10 heating cycles, with little difference in these values after the initial cycle. Similar results were obtained for thermal energy available for release at +17° to −23° C. (16.3 calories per gram for 1 or 10 cooling cycles). In contrast, the unmodified wool had thermal storage values of 12.5 calories per gram and release values of 12.8 calories per gram in the same temperature intervals, due only to the specific heat of the unmodified fabric.

Treatment of heat set polyester fabric (3.6 oz/yd$^2$; thread count 67 warp ×57 fill; 10 in. wide ×10 in. long) under identical conditions as that for the wool above (only difference was a 77% wet pickup), produced a modified fabric with a weight gain of 42.9% (0.429 gm per gram of fiber) that had thermal storage values of 12.7 calories/gram for 1 or 10 heating cycles and thermal release values of 13.1 calories/gram for 1 or 10 cooling cycles (same ranges as the wool fabrics). In contrast, the unmodified polyester had thermal storage values of 9.3 calories/gram and thermal release values of 9.7 calories/gram for 1 or 10 cycles due only to the specific heat of the unmodified fabric.

EXAMPLE 23

Incorporation of Polyethylene Glycol (av. molecular wt. 600) into Cotton Fabrics by Its Reaction with Crosslinking Agents To Produce Modified Fabrics Having Improved (Except Thermal Storage and Release) Properties Cotton printcloth (as in Example 19) was immersed separately into two different aqueous solutions (by wt.) of Carbowax 600: (a) 35% polyethylene glycol, 7% dihydroxydimethylolethylene urea (DMDHEU), 2.1% mixed catalyst (MgCl$_2$/citric acid); and (b) 50% polyethylene glycol, 15% DMDHEU, and 4.5% mixed catalyst (MgCl$_2$/citric acid) at 25° C., then excess solution removed by running each of the treated fabrics through a squeeze roller at 40 lb. pressure to a wet pickup of 100%. Fabrics were then mounted on pin frames, dried 7 min. at 60° C. in a force-draft oven, then cured an additional 2 min. at 170° C. Both fabrics were washed for 20 mins. at 50° C. with running tap water and liquid detergent prior to tumble drying. After conditioning, the first fabric had a weight of 16.5% while the second fabric had a weight gain of 59%. Neither of the fabrics exhibited any endotherms or exotherms on heating or cooling cycles when evaluated by differential scanning calorimetry and were essentially the same as the untreated cotton fabrics in their thermal storage and release properties; i.e. their heat content was due only to their specific heat. However, other textile properties in both treated fabrics were improved relative to untreated cotton printcloth: (a) conditioned wrinkle recovery (warp +fill) angle in the first treated fabric was 292° and 278° in the second treated fabric compared to only 170° for untreated cotton fabric; (b) oily soil release (using a modified Milliken Test Method DMRG-TT-100 in which the fabrics were soiled then washed and their reflectances values measured) was improved for both treated fabrics (retention of 90 and 86% of their reflectance for the first and second treated fabrics) relative to the control (only 54% retention of reflectance); (c) static charge remaining on the treated fabrics at 65% relative humidity (AATCC Test 76-1982) was 11,000 and 2,000 (ohms ×10$^8$) compared to 91,000 for the untreated cotton printcloth.

EXAMPLE 24

Incorporation of Polyethylene Glycol (av. molecular wt. 1,450) into Acrylic Fabric by Its Reaction with Crosslinking Agents Acrylic fleece fabric (5.2 oz/yd$^2$; 18 in ×24 in) was immersed in an aqueous solution containing 50% aq. polyethylene glycol 1,450, 13% DMDHEU, 3.9% mixed catalyst (MgCl$_2$/citric acid) at 25° C., then excess solution removed as in Example 23 (40 lb. pressure) to give a fabric with a wet pickup of 166%. The fabric was subsequently dried on a pin frame for 6 min. at 80° C., then cured for 2 min. at 140° C. The modified fabric was then washed and tumble dried (as in Example 19) to give an add-on or weight gain of 87%. The resultant fabric had thermal storage values of 19.8 cal/g in the range of +2° to +42° C. on heating and thermal release values of 20.2 cal/g in the range of +27° to −13° C. on cooling, characterized by an endotherm on heating and an exotherm on cooling. In contrast the untreated acrylic fabric has thermal storage values of only 11.0 cal/g and thermal release values of 9.6 cal/g in the same temperature ranges. The modified acrylic fabric also prossessed superior flex abrasion compared to the untreated acrylic fabric. When the Stoll abrasion of the back sides of both fabrics were measured, the treated fabric lasted 4,650 cycles to failure while the untreated fabric lasted only 792 cycles. Residual static charge (tested as in Example 23) was also substantially less for the treated fabric ($10,070 \times 10^8$ ohms) than for the untreated fabric ($57,000 \times 10^8$ ohms).

EXAMPLE 25

Incorporation of Polyethylene Glycol (av. molecular wt. 1,000) into Single Knit Jersey T-Shirts (50/50 Cotton/Polyester) by Reaction with Crosslinking Agents and Evaluation of Durability of Finish to Prolonged Laundering 50/50 Cotton/polyester (light blue color) single knit jersey T-shirts (4.4 oz/yd$^2$) were immersed in 50% aq. PEG-1,000/11% DMDHEU/3.3% mixed catalyst (MgCl$_2$/citric acid) at 25° C., excess solution removed at 40 lb pressure (as in Example 23) to a wet pickup of 100%. The shirts were draped over pin frames and dried and cured as in previous examples (dried 7 min. at 75° C. and cured 2 min. at 150° C.). The shirts were machine washed and tumble dried to give modified garments with weight gains of 55% after conditioning. The thermal storage and release values of the treated shirt were on heating (in the range of $-3°$ to $+37°$ C.) 15.6 cal/g and on cooling (in the range of $-17°$ to $+23°$ C.) 14.7 cal/g, compared to only 9.8 cal/g and 9.7 cal/g on heating and cooling for untreated shirts laundered and dried once.

After 50 machine washing and tumble dryings, the treated shirts still had a weight gain of 37%, and had little if any pilling or surface entaglement of fibers compared to extensive and visually noticeable pilling in untreated shirts that were also laundered and dried 50 times. Moreover, the thermal storage and release propreties of the treated shirts after 50 launderings were respectively 13.7 cal/g and 13.5 cal/g on heating and cooling in the same temperatures ranges described above. These values were significantly higher than those of untreated shirts laundered 50 times (9.5 cal/g on heating and 9.5 cal/g on cooling) in the same temperature intervals.

EXAMPLE 26

Incorporation of Polyethylene Glycol (av. molecular wt. 1,000) into Glass Fabric by its Reaction with Crosslinking Agents Fiberglas fabric (3.2 oz/yd$^2$) was treated identically as the T-shirts in Example 25 to a wet pickup of 50%, dried 7 min. at 60° C. and cured 3 min. at 160° C., washed in warm water and detergent for 30 min. and air-dried. After conditioning the treated glass fabric had a weight gain of 21%. Its moisture regain after 12 hours was appreciably higher (8.2%) than the untreated glass fabric (0.4%) using standard test methods for this evaluation. Its thermal storage in the range of $-3°$ to $+37°$ C. was 14.3 cal/g on heating and characterized by an endotherm in this range in contrast to the untreated glass fabric whose thermal storage value was only 5.5 cal/g in the same range and due only to the specific heat of the glass fiber or fabric.

EXAMPLE 27

Incorporation of Polyethylene Glycol (av. molecular wt. 1,000) into Cotton/Polyester Fabric by Its Reaction with Crosslinking Agents At Low Cure Temperatures 50/50 Cotton/polyester printcloth (4.1 oz/yd$^2$) was treated identically as were the T-shirts in Example 25 at 40 lb. pressure to a wet pickup of 100%. The fabric was subsequently dried 7 min. at 75° C. and dried at a low cure temperature of only 110° C. for 2 min., then machine washed and tumble dried to a wt. gain of 45% after conditioning. The resultant fabric had a thermal storage value (on heating) of 18.7 cal/g in the range of $+7°$ to $+47°$ C. and a thermal release value (on cooling) of 16.8 cal/g in the range of $+17°$ to $-23°$ C. For untreated cotton/polyester printcloth in the same temperature intervals, the thermal storage and release values (due to specific heat of the fiber alone) were respectively on heating 10.1 cal/g and on cooling 9.7 cal/g. Moreover, the treated fabric had improvement in several properties relative to the untreated fabric: (a) flex abrasion-cycles to failure ($>5,000$ for treated vs 3,500 for untreated); (b) pilling resistance rating with brush pilling apparatus (5.0 for treated vs. 3.3 for untreated, with 5.0 being the best rating); (c) conditioned wrinkle recovery angle-warp +fill directions (279 for treated vs 247 for untreated); (d) residual static charge in ohms $\times 10^8$ at 65% relative humidity (1,800 for treated vs 39,000 for untreated); (e) % moisture regain after 12 hrs. (24.8 for treated vs 3.5 for untreated).

EXAMPLE 28

Incorporation of Polyethylene Glycol (av. molecular wt. 1,000) into Paper Products by its Reaction with Crosslinking Agents Commercial paper towels (reinforced with polyamide fibers in both directions) (2.1 oz/yd$^2$) were treated with the PEG-1,000 with identical compositions as that described in Example 25 to a wet pickup of 137%, utilizing 30 lb. pressure to remove excess liquid from the paper. Subsequent drying for 7 min. at 70° C. and curing for 2 min. at 150° C. producing after washing in warm water and liquid detergent and air-drying to constant weight, a treated paper towel with a wt. gain of 39%.

The treated paper towel had a thermal storage value of 15.4 cal/g in the range of $-3°$ to $+37°$ C. (on heating) and a thermal release value of 20.7 cal/g in the range of $+22°$ to $-18°$ C. (on cooling). In contrast, the untreated paper towel had thermal storage and release values of 11.6 cal/g and 11.0 cal/g, respectively in the same temperature ranges due only to the specific heat of the cellulosic and polyamide fibers in the towel. After 12 hrs. the moisture regain for the treated paper towel was 26.5% and only 8.5% for the untreated paper towel.

EXAMPLE 29

Incorporation of Polyethylene Glycol (av. molecular wt. 8,000) into Cotton/Polyester Fabric by Reaction with Crosslinking Agents Two pieces of 50/50 Cotton/polyester printcloth (4.1 oz/yd$^2$) were immersed in (a) 45% aq. polyethylene glycol 8,000/10% DMDHEU/0.78% mixed catalyst (0.5% p-toluenesulfonic acid-0.25% MgCl$_2$-0.03% citric acid) and (b) 45% aq. PEG-8,000/10% DMDHEU at 30° C., put through squeeze rollers at 40 lb. pressure to a wet pickup of 90%, then dried 5 min. at 85° C. and cured 2 min. at 140° C. After washing in hot water (60° C.) and liquid detergent and tumble drying, the first fabric had a weight gain of 43% and the second fabric did not retain the polyol and had no weight gain.

The thermal storage value of the first fabric (on heating) in the temperature range of 32°–77° C. was 20.0 cal/g and its thermal release value (on cooling) in the temperature range of 47° to 7° C. was 18.5 cal/g, and characterized by sharp endotherms on heating and sharp exotherms on cooling. In contrast, the second fabric (one not treated in the presence of an acid catalyst) in the same temerature intervals exhibited thermal storage values of 12.3 cal/g and thermal release values of 11.3 cal/g due only to the specific heat of the untreated fabric.

EXAMPLE 30

Incorporation of Polyethylene Glycol (av. molecular wt. 20,000) into Acrylic Fleece Fabric by Reaction with Crosslinking Agents Acrylic fleece fabric (5.2 oz/yd$^2$) was immersed in (a) 40% aq. polyethylene glycol 20,000/10% DMDHEU/0.76% mixed catalyst (0.5% p-toluenesulfonic acid-0.25% $MgCl_2$-0.01% citric acid), put through squeeze rollers at 40 lb. pressure to a wet pickup of 206%, then dried 5 min. at 85° C. and cured 2 min. at 140° C. After washing in hot water (60° C.) and liquid detergent and drying in a force draft oven to constant weight, the modified acrylic fabric had a weight gain after conditioning of 89%.

Its thermal storage value (on heating) in the temperature range of 32°–77° C. was 25.6 cal/g and its thermal release value (on cooling) in the temperature range of 57° to 17° C. was 23.2 cal/g, and characterized by sharp endotherms on heating and sharp exotherms on cooling. In contrast, untreated acrylic fabric in the same temerature intervals exhibited thermal storage values of 11.6 cal/g and thermal release values of 11.5 cal/g due only to the specific heat of the untreated fabric. % reflectance values of the treated fabric (as in Example 23) were 96% after soiling and one laundering compared to only 65% for the untreated fabric under comparable conditions.

We claim:

1. Temperature-adaptable non hollow textile fibers which store heat when the temperature rises and release heat when the temperature decreases, said fibers impregnated with a phase-change or plastic crystalline material which is chemically and physically compatible with said fibers, said material being present in an amount effective to cause said fibers to store heat when the temperature rises and release heat when the temperature decreases.

2. The fibers of claim 1 wherein said fibers are selected from the group consisting of cotton, rayon, wool, polyamides, polyester, and polypropylene.

3. The fibers of claim 1 wherein said phase-change material is selected from the group consisting of congruent inorganic salt hydrates and cross-linked polyethylene glycols, and wherein said plastic crystalline material is a polyhydric alcohol.

4. The fibers of claim 2 wherein said phase-change material is selected from the group consisting of congruent inorganic salt hydrates and cross-linked polyethylene glycols, and wherein said plastic crystalline material is a polyhydric alcohol.

5. The fibers of claim 3 wherein said phase-change material is selected from the group consisting of calcium chloride hexahydrate in admixture with strontium chloride hexahydrate, lithium nitrate trihydrate, and zinc nitrate hexahydrate, and wherein said plastic crystalline material is selected from the group consisting of pentaerythritol, 2,2-dimethyl-1,3-propanediol, 2-hydroxymethyl-2-methyl-1,3-propanediol, and amino alcohols.

6. The fibers of claims 3 or 4 wherein said phase-change material is cross-linked polyethylene glycol, wherein the degree of cross-linking is sufficient to make said material water insoluble and to maintain the ability of said material to change phases upon heating and cooling, and further wherein said impregnated fibers have improved properties as to soil release, durable press, resistance to static charge, abrasion resistance, pilling resistance, and water absorbency.

7. The fibers of claim 4 wherein said phase-change material is selected from the group consisting of calcium chloride hexahydrate in admixture with strontium chloride hexahydrate, lithium nitrate trihydrate, and zinc nitrate hexahydrate, and wherein said plastic crystalline material is selected from the group consisting of pentaerythritol, 2,2-dimethyl-1,3-propanediol, 2-hydroxymethyl-2-methyl-1,3-propanediol, and amino alcohols.

8. The fibers of claim 4 wherein said material is a polyhydric alcohol.

9. The fibers of claim 4 wherein said material is selected from the group consisting of congruent inorganic salt hydrates, and cross-linked polyethylene glycols.

10. The fibers of claim 6 wherein said material is present in an amount of about 0.25–0.50 grams per gram of fiber.

11. Non-hollow textile fibers impregnated with at least 0.15 grams of cross-linked polyethylene glycol per gram of fiber, wherein the degree of cross-linking makes said polyethylene glycol water insoluble, said cross-linked polyethylene glycol being present in an amount effective to cause said fibers to store heat when the temperature rises and release heat when the temperature decreases.

12. The fibers of claim 11 wherein said polyethylene glycol is present in an amount of at least 0.25 grams per gram of fiber, and where the degree of cross-linking is sufficient to permit said polyethylene glycol to change phases upon heating and cooling.

13. The fibers of claim 11 wherein said fibers are selected from the group consisting of cotton, rayon, wool, polyamide, polyester, polypropylene, poly acrylic, glass and blends thereof.

14. The fibers of claim 12 wherein said fibers are selected from the group consisting of cotton, rayon, wool, polyamide, polyester, polypropylene, poly acrylic, glass and blends thereof.

15. The fibers of claim 11 wherein said impregnated fibers have improved properties as to soil release, durable press, resistance to static charge, abrasion resistance, pilling resistance and water absorbency.

16. The fibers of claim 12 wherein said impregnated fibers have improved properties as to soil release, durable presss, resistance to static charge, abrasion resistance, pilling resistance and water absorbency.

17. The fibers of claim 11 wherein said polyethylene glycol has a molecular weight of greater than 1500.

18. The fibers of claim 12 wherein said polyethylene glycol has a molecular weight of greater than 1500.

19. The fibers of claim 16 wherein said fibers are selected from the group consisting of cotton, rayon, wool, polyamide, polyester, polypropylene, poly acrylic, glass, and blends thereof.

20. Non-hollow cellulosic fibers impregnated with at least 0.15 grams of cross-linked polyethylene glycol per gram of fiber, wherein the degree of cross-linking makes the polyethylene glycol water insoluble, said cross-linked polyethylene glycol being present in an amount effective to cause said fibers to store heat when the temperature rises and release heat when the temperature decreases.

21. The fibers of claim 20 wherein said polyethylene glycol is present in an amount of at least 0.25 grams per gram of fiber, and wherein the degree of cross-linking permits the polyethylene glycol to change phases upon heating and cooling.

22. The fibers of claim 20 wherein said fibers are paper or wood pulp fibers.

23. The fibers of claim 21 wherein said fibers are paper or wood pulp fibers.

24. The fibers of claim 20 where said impregnated fibers have improved properties as to soil release, durable press, resistance to static charge, abrasion resistance, pilling resistance and water absorbency.

25. The fibers of claim 21 wherein said impregnated fibers have improved properties as to soil release, durable press, resistance to static charge, abrasion resistance, pilling resistance and water absorbency.

26. The fibers of claim 20 wherein the molecular weight of said polyethylene glycol is greater than 1500.

27. The fibers of claim 21 wherein the molecular weight of said polyethylene glycol is greater than 1500.

* * * * *